Patented June 15, 1943

UNITED STATES PATENT OFFICE 2,321,897

SYNTHETIC RESIN PLASTIC COMPOSITIONS

Edgar C. Britton and Gerald H. Coleman, Midland, Mich., assignors to The Dow Chemical Company, Midland, Mich., a corporation of Michigan No Drawing. Application March 15, 1941,
Serial No. 383,552

4 Claims. (Cl. 260—36)

This invention concerns certain new plastic compositions comprising a benzene-insoluble glass-like resin derived from styrene and, as a plasticizing agent therefor, an ester of levulinic acid.

It is known that solid resinous products may be obtained by polymerizing monomeric styrene together with a variety of other unsaturated organic compounds containing olefinic linkages, such as allyl cinnamate, diallyl malleate, and dioxylene dicinnamate. These and other typical examples of such resinous products are described in the following United States patents: 2,047,398 to Voss et al.; 2,089,444 to Staudinger et al.; 2,186,359 to Britton et al.; 2,186,360 to Britton et al.; and 2,205,390 to Britton et al. Others are described in the co-pending applications of Britton et al.; Serial No. 199,892, filed April 4, 1938, and Serial No. 324,230, filed March 15, 1940. These products are obtained as glass-like thermoplastic resins or as opaque, white, friable materials.

Certain of the polymers initially obtained as glass-like resins are insoluble in benzene and other of the usual solvents for polystyrene, e. g. carbon tetrachloride, dioxane, methylene chloride, toluene, ethyl benzene, etc. In some cases the polymers are capable of being swelled in such solvents to form insoluble gels. All such solid resinous products are herein referred to as "co-polymers," although their exact chemical constitution is not definitely known. Similarly, the unsaturated compounds which may be employed in preparing such products are referred to as "co-polymerizing agents" and the polymerization of mixtures of styrene and such agents is referred to as "co-polymerization." All of such co-polymers of styrene possess properties which render them valuable in the manufacture of molded or shaped objects, since they are stable to discoloration, have good dielectric strength, high mechanical strength and impermeability to moisture, and are resistant to attack by acids, alkalies, etc.

In preparing such molded or shaped products, however, difficulty is encountered in securing adequate flow during molding without resorting to the use of molding temperatures considerably higher than those usually employed in molding thermoplastic materials. Particular difficulty has been experienced with the benzene-insoluble glass-like co-polymers since many of the compounds employed as plasticizing agents to increase the plasticity and flow during molding of pure polystyrene or of soluble co-polymers of styrene are unsatisfactory as plasticizing agents for the insoluble co-polymers of styrene. Many of these plasticizers impart the desired properties of the benzene-insoluble co-polymers only when used in such large proportions that the mechanical strength of the composition is greatly reduced. Certain of such plasticizing agents are further disadvantageous in that they are not sufficiently compatible and tend to exude to the surface of the plasticized composition with resultant loss in plasticizing action and, frequently, blushing of the finished product.

We have now found that esters of levulinic acid may be advantageously employed as plasticizing agents for the benzene-insoluble glass-like co-polymers of styrene. Compositions comprising benzene-insoluble glass-like styrene co-polymers plasticized with relatively small amounts of esters of levulinic acid possess adequate plasticity and flow at molding temperatures, and when plasticized in relatively large proportions are tough rubbery products. The new plasticizing agents not only do not impair the strength characteristics, clearness, and transparency of the unplasticized insoluble co-polymers, but in many cases cause improved strength characteristics and a decreased tendency to blush or craze upon aging.

The esters of levulinic acid which we have found to be most suitable as plasticizing agents for the benzene-insoluble glass-like co-polymers of styrene may be represented by the following formula:

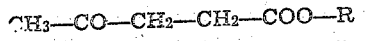

wherein R represents an organic radical, e. g. alkyl, alkenyl, aryl, aralkyl, cycloalkyl, aryloxyalkyl, halo-alkyl, halo-aryloxy-alkyl, etc. Examples of such compounds are allyl levulinate, 2-chloroallyl levulinate, cyclohexyl levulinate, benzyl levulinate, beta-(phenoxy)-ethyl levulinate, beta-(4-tertiarybutyl-phenoxy)-ethyl levulinate, beta-(3-chloro-2-xenoxy)-ethyl levulinate, etc.

The new plastic compositions comprising benzene-insoluble glass-like co-polymers of styrene and esters of levulinic acid are preferably prepared by polymerizing a mixture of styrene and the co-polymerizing agent in the presence of the plasticizing agent. The latter may be employed in any proportion within the limits of its compatibility with the co-polymer, but is usually employed in an amount representing from 0.5 to 50 per cent by weight of the entire composition, the most effective amount depending somewhat upon the use to which the composition is to be put. For example, compositions which can be employed in the manufacture of hard molded objects preferably contain from about 1 to about 10 per cent by weight of the plasticizing agent, whereas rubber-like compositions contain a somewhat greater proportion of plasticizing agent, e. g. 35 to 50 per cent. Co-polymerizing agents are usually employed in amounts representing 0.1 to 15 per cent by weight of the styrene, although the optimum amount depends upon the particular co-polymerizing agent employed and upon the properties desired in the composition. Polymerization is usually carried out by heating the mixture of monomeric styrene, co-polymerizing agent, and plasticizing agent at a moderately elevated temperature, e. g. 60–180° C., for ½ to 14 days, during which time the mixture gradually polymerizes to form a resinous polymer having the plasticizing agent homogeneously dispersed therethrough.

Compositions comprising benzene-insoluble co-polymers of styrene of the type capable of being swelled by solvents may be prepared by forming the co-polymers in the absence of plasticizing agent, that is, by polymerizing a mixture of monomeric styrene and a co-polymerizing agent, and thereafter causing the insoluble co-polymers to swell to a gel in a solution of the plasticizing agent and a swelling solvent, e. g. benzene, toluene, carbon tetrachloride, etc. During the swelling operation the plasticizing agent is absorbed by the co-polymer gel, and after the removal of solvent the co-polymer is recovered in a form having the plasticizing agent uniformly and intimately dispersed therethrough. This method of incorporating a plasticizing agent with a styrene co-polymer forms the subject matter of a co-pending application of Britton and Marshall, Serial No. 209,736, filed May 24, 1938. A third method which may be employed in preparing the new compositions comprises mechanically mixing the finely-divided co-polymer with a plasticizing agent in a Banbury-type mixer or on heated compounding rolls until a homogeneous composition is obtained.

The following examples illustrate a number of ways in which the principle of the invention has been applied but are not to be construed as limiting the same:

EXAMPLE 1

Compositions comprising benzene-insoluble glass-like co-polymers of styrene and dioxylene dicinnamate plasticized with various esters of levulinic acid were prepared by polymerizing mixtures containing 50 grams of monomeric styrene, 0.25 gram of dioxylene dicinnamate, and from 1 to 4.5 grams of the plasticizing agent at a temperature of 100° C. for 336 hours. The resulting co-polymers were ground, dried, and molded into test specimens, employing a molding temperature of 160° C. No difficulty was experienced in the molding and no significant impairment of impact strength and tensile strength occurred. The data obtained is summarized in the following table, which for purposes of comparison includes data on an unplasticized benzene-insoluble co-polymer prepared under the above defined conditions.

Table

| Plasticizer | Per cent | Thickness of test specimen, inches | Impact strength, inch lbs. | Tensile strength, lbs./sq. in. |
|---|---|---|---|---|
| None | | 0.104 | 1.4 | 5,500 |
| Beta-(3-chloro-xenoxy)-ethyl levulinate | 4.5 | 0.102 | 1.3 | 6,400 |
| Beta-(4-tertiarybutyl-phenoxy)-ethyl levulinate | 9.0 | 0.099 | 1.0 | 5,700 |
| Beta-(phenoxy)-ethyl levulinate | 5.0 | 0.100 | 1.5 | 7,100 |
| 2-chloroallyl levulinate | 2.0 | 0.096 | 1.2 | 5,900 |

EXAMPLE 2

A mixture of 25 grams of styrene, 2.5 grams of diallyl maleate, and 20 grams of cyclohexyl levulinate was polymerized at 135° C. for 12 hours. The resulting co-polymer was ground, dried, and molded at 160° C. The molded product was clear, colorless, and rubbery.

We claim:

1. A rubbery composition of matter comprising a benzene-insoluble glass-like co-polymer of styrene and, as a plasticizer therefor, between about 35 and about 50 per cent by weight of a compound of the formula $$CH_3-CO-CH_2-CH_2-COO-R$$

wherein R represents an aryloxy-alkyl radical.

2. A rubbery composition of matter comprising a benzene-insoluble glass-like co-polymer of styrene and, as a plasticizer therefor, between about 35 and about 50 per cent by weight of beta-(3-chloro-2-xenoxy)-ethyl levulinate.

3. A rubbery composition of matter comprising a benzene-insoluble glass-like co-polymer of styrene and, as a plasticizer therefor, between about 35 and about 50 per cent by weight of beta-(4-tertiarybutyl-phenoxy)-ethyl levulinate.

4. A rubbery composition of matter comprising a benzene-insoluble glass-like co-polymer of styrene and, as a plasticizer therefor, between about 35 and about 50 per cent by weight of beta-(phenoxy)-ethyl levulinate.

EDGAR C. BRITTON.
GERALD H. COLEMAN.